(12) United States Patent
Hwang et al.

(10) Patent No.: US 8,309,254 B2
(45) Date of Patent: Nov. 13, 2012

(54) NEGATIVE ACTIVE MATERIAL FOR RECHARGEABLE LITHIUM BATTERY AND RECHARGEABLE LITHIUM BATTERY COMPRISING SAME

(75) Inventors: Cheol-Hee Hwang, Suwon-si (KR);
Bong-Chull Kim, Suwon-si (KR);
Se-Ho Park, Suwon-si (KR);
Dong-Yung Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 372 days.

(21) Appl. No.: 12/775,320

(22) Filed: May 6, 2010

(65) Prior Publication Data

US 2010/0285359 A1 Nov. 11, 2010

(30) Foreign Application Priority Data

May 7, 2009 (KR) .................. 10-2009-0039791

(51) Int. Cl.
*H01M 4/13* (2010.01)
*H01M 4/58* (2010.01)
(52) U.S. Cl. .................. 429/231.8; 429/218.1
(58) Field of Classification Search .............. 429/218.1, 429/231.8
See application file for complete search history.

(56) References Cited

U.S. PATENT DOCUMENTS

| | | | |
|---|---|---|---|
| 6,391,495 B1 | 5/2002 | Choi et al. | |
| 2010/0273058 A1 | 10/2010 | Lee et al. | |

FOREIGN PATENT DOCUMENTS

| | | |
|---|---|---|
| JP | 10-003920 | 1/1998 |
| JP | 2000-203818 | 7/2000 |
| JP | 2002-008647 | 1/2002 |
| JP | 2003-017051 | 1/2003 |
| JP | 2003-100284 A | 4/2003 |
| KR | 1020050007311 | 1/2005 |
| KR | 1020050013841 | 2/2005 |
| KR | 1020060026203 | 3/2006 |
| KR | 1020060048753 | 5/2006 |
| KR | 1020060051615 | 5/2006 |
| KR | 10-2006-0087003 A | 8/2006 |
| KR | 1020060103031 | 9/2006 |
| KR | 1020070034254 | 3/2007 |
| KR | 1020070076686 | 7/2007 |
| KR | 1020070113066 | 11/2007 |

OTHER PUBLICATIONS

Korean Notice of Allowance regarding Application No. 9-5-2011-04382332 dated Mar. 15, 2011, 5 pages.

*Primary Examiner* — Jessee R. Roe
(74) *Attorney, Agent, or Firm* — Knobbe Martens Olson & Bear LLP

(57) ABSTRACT

A negative active material for a rechargeable lithium battery includes: a crystalline carbon core including pores; an amorphous carbon shell positioned on the core surface; metal nanoparticles dispersed inside the pores; and amorphous carbon inside the pores, wherein a first particle diameter difference (D50–D10) of the nanoparticles is from about 70 to about 150 nm and the second particle diameter difference (D90–D50) of the nanoparticles is from about 440 to about 520 nm.

27 Claims, 2 Drawing Sheets

NEGATIVE ACTIVE MATERIAL FOR RECHARGEABLE LITHIUM BATTERY AND RECHARGEABLE LITHIUM BATTERY COMPRISING SAME

CROSS-REFERENCE TO RELATED APPLICATION

This application claims priority to and the benefit of Korean Patent Application No. 10-2009-0039791 filed in the Korean Intellectual Property Office on May 7, 2009, the entire contents of which are incorporated herein by reference.

BACKGROUND OF THE INVENTION

1. Field of the Invention

The present embodiments relate to a negative active material for a rechargeable lithium battery and a rechargeable lithium battery including the same. More particularly, the present embodiments relate to negative active material for a rechargeable lithium battery having excellent cycle-life characteristics and a rechargeable lithium battery including the same.

2. Description of the Related Art

Lithium rechargeable batteries have recently drawn attention as a power source of small portable electronic devices. They use an organic electrolyte and thereby have twice the discharge voltage of a conventional battery using an alkali aqueous solution, and accordingly have high energy density.

For positive active materials of a rechargeable lithium battery, lithium-transition element composite oxides being capable of intercalating lithium such as $LiCoO_2$, $LiMn_2O_4$, ($0<x<1$), and so on have been researched.

As for negative active materials of a rechargeable lithium battery, various carbon-based materials such as artificial graphite, natural graphite, and hard carbon, which can all intercalate and deintercalate lithium ions, have been used. However, recently there has been research into non-carbon-based negative active materials such as Si in accordance with need for stability and high-capacity.

SUMMARY OF THE INVENTION

One aspect of the present embodiments provides a negative active material for a rechargeable lithium battery having improved cycle-life characteristics.

Another aspect of the present embodiments provides a rechargeable lithium battery including the negative active material.

The present embodiment is not limited to the above technical purposes, and a person of ordinary skill in the art can understand other technical purposes.

According to one aspect of the present embodiments, a negative active material for a rechargeable lithium battery is provided that includes a crystalline carbon core including pores; an amorphous carbon shell positioned on a surface of the core surface; metal nanoparticles dispersed inside the pores; and amorphous carbon inside the pores. A first particle diameter difference (D50–D10) of the nanoparticles ranges from about 70 to about 150 nm and the second particle diameter difference (D90–D50) of the nanoparticles ranges from about 440 to about 520 nm.

Hereinafter, further embodiments will be described in detail.

The negative active material for a rechargeable lithium battery according to the present embodiments shows excellent cycle-life characteristics.

DETAILED DESCRIPTION OF THE INVENTION

Figure 1:
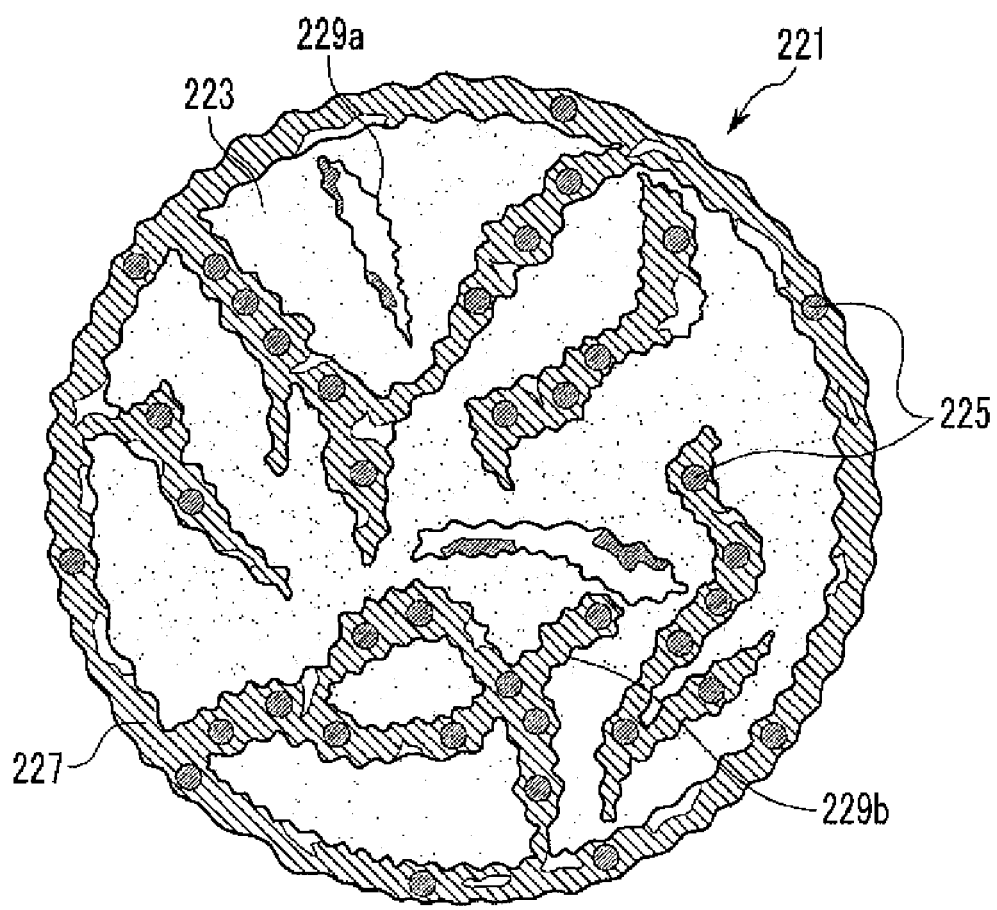
FIG. 1 is a view of a negative active material according to one embodiment.

Exemplary embodiments will hereinafter be described in detail. However, these embodiments are only exemplary, and are not limited thereto.

According to some embodiments, a negative active material for a rechargeable lithium battery including metal and a carbon-based material is provided. As used herein, the term "metal" refers to a material having good thermo- or electric-conductivity, and non-limiting examples thereof include a general metal such as alkali metal and semi-metal having semi-conductivity such as Si.

The negative active material includes a crystalline carbon core including pores, an amorphous carbon shell positioned on a surface of the core, metal nanoparticles dispersed inside the pores and amorphous carbon inside the pores. In the specification, "D10" of a group of particles refers to the equivalent diameter where 10 mass % of the powder has a smaller diameter. In the specification, "D50" of a group of particles refers to the diameter where 50 mass % of the powder has a larger equivalent diameter and the other 50 mass % has a smaller equivalent diameter. In the specification, "D90" of a group of particles refers to the equivalent diameter where 90 mass % of the powder has a smaller diameter. In one embodiment, a first particle diameter difference (D50–D10) of the nanoparticles is from about 70 to about 150 nm and the second particle diameter difference (D90–D50) of the nanoparticles is from about 440 to about 520 nm. In another embodiment, the first particle diameter difference (D50–D10) of the nanoparticles is from about 90 to about 130 nm and the second particle diameter difference (D90–D50) of the nanoparticles is from about 440 to about 500 nm.

As described above, since the first and second particle diameter differences of the nanoparticles suggested in the embodiment are smaller than those of conventional nanoparticles, which are from 200 to 230 nm and from 650 to 680 nm, respectively, it can be seen that the nanoparticles of the present embodiments have a particle distribution of uniform sharpness. Also, the uniform particle distribution may improve cycle-life characteristics. Nanoparticles having uniform particle distribution signifies that the nanoparticles have a more uniform size, which results in the metal nanoparticles being dispersed well into the inside of crystalline carbon. Accordingly, since the probability that the metal nanoparticles directly contact an electrolyte becomes smaller, the cycle-life characteristics are improved. When the particle distribution is not uniform and not sharp, but broad, it results in the presence of metal particles with a large size, which are not dispersed well into the inside of crystalline carbon core but are likely to be on the surface. Thus, the side reaction with the electrolyte increases, thereby deteriorating the cycle-life characteristics.

As used herein, D10 denotes a particle size at a volume ratio of 10% in a cumulative size-distribution curve, and D50 denotes a particle size at a volume ratio of 50%, while D90 denotes a particle size at a volume ratio of 90%. Also, a first particle diameter difference (D50–D10) signifies the difference between the particle size of D50 and the particle size of D10, and a second particle diameter difference (D90–D50) signifies the difference between the particle size of D90 and the particle size of D50.

In one embodiment, the particle diameter may be measured through a general particle diameter measurement method. Also, the difference between the first particle diameter and the second particle diameter is maintained after a battery is fabricated or after a chemical formation process. This may be measured in the following method.

First, a negative electrode with a negative active material layer formed therein is put into a current collector filled with a mixed solvent of an organic solvent and water and then ultrasonication is performed. The ultrasonication process separates the negative active material layer from the current collector to thereby produce a solution including only the negative active material without any other material, e.g., a binder, included in the negative active material layer. The ultrasonication process may be performed using a general sonicator. The sonicator is not limited to a specific type of sonicator. Preferably, the ultrasonication process separates the negative active material from the current collector at room temperature.

The solution onto which the ultrasonication has been performed is filtered and dried to thereby acquire a negative active material. The drying process may be generally performed at room temperature. Preferably the drying process is performed at a temperature that the solvent could be removed. However, the drying process does not have to be limited specifically, either.

The acquired negative active material is fired at a drying furnace at a high temperature. The high-temperature firing process removes substantially all the carbon-based material and leaves only metal nanoparticles. The high temperature may be from about 800 to about 1000° C. The particle diameter of the metal nanoparticles may be measured through a general particle measurement method.

The average particle diameter of the metal nanoparticles dispersed inside the pores is preferably not be greater than about 500 nm, and in consideration of processing and economical aspects, the average particle diameter may be from at least about 100 nm to about 500 nm. However, the metal nanoparticles may be used if their minimal average particle diameter is at least equal to or greater than 10 nm.

The content of the metal nanoparticles may be from about 5 to about 30 wt % based on the total weight of the negative active material.

The metal refers to a material having an good thermo- or electric-conductivity, and non-limiting examples thereof include a general metal such as alkali metal and semi-metal having semi-conductivity such as Si.

Examples of the metal include Si, a Si—Y alloy (where Y is an element such as an alkali metal, an alkaline-earth metal, a group 13 element, a group 14 element, a transition element, a rare earth element, or combinations thereof, and is not Si), Sn, a Sn-Q alloy (where Q is an element such as an alkali metal, an alkaline-earth metal, a group 13 element, a group 14 element, a transition element, a rare earth element, or combinations thereof and is not Sn), Al, Ga, In, Pb, As, Sb, Ag, or combinations thereof. In some embodiments, the element Y may be, for example, Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, or combinations thereof.

In some preferred embodiments, the metal can be Si, Sn, Al, Ge, or combinations thereof.

The crystalline carbon may include natural graphite, artificial graphite, or a mixture thereof. The natural graphite or artificial graphite may be, for example, shapeless, sheet-type, flake-type, spherical-shaped or fiber-shaped. The amorphous carbon may include at least one of soft carbon (low temperature fired carbon) or hard carbon, mesophase pitch carbide, fired cokes or a mixture thereof.

The content of the amorphous carbon may be from about 10 to about 15 wt % based on the total weight of the negative active material, and the content of the crystalline carbon may be from about 55 to about 85 wt % based on the total weight of the negative active material. When the content of the amorphous carbon falls in the range, a negative active material composite of metal and a carbon-based material may be obtained.

The average particle diameter of the negative active material may be from about 5 to about 40 μm.

The structure of the negative active material is schematically shown in FIG. 1, but the structure of the negative active material according to an embodiment is not limited to one shown in FIG. 1. The negative active material 221 shown in FIG. 1 includes crystalline carbon core 223 including pores and amorphous carbon shell 227. The pores include closed pores 229a formed inside the core while not connected to the shell 227 and open pores 229b extended to the inside while connected to the shell 227. Also, the open pores 229b include metal nanoparticles 225 dispersed inside, and both of the open pores 229b and the closed pores 229a may include amorphous carbon.

The pores may have a shape of pipe or plate, and they may form a network inside the core. The porosity of the negative active material may be from about 30 to about 50 volume % based on the entire volume of the negative active material. When the porosity falls in the range, there is an advantage that when the negative active material is expanded, the internal expansion may be absorbed inside the negative active material.

The core-shell type negative active material composite is used to fabricate a crystalline carbon core by first milling crystalline carbon fine particles. As fine particles are agglomerated during the milling process, the pores including the closed pores and the open pores may be formed inside the core.

The crystalline carbon core is immersed in a metal nanoparticle containing liquid. During the immersion process, the metal nanoparticle liquid may be inserted into the open pores of the carbon core. The metal nanoparticle liquid may be prepared by pulverizing metal and putting the acquired metal nanoparticles into an organic solvent. As for the organic solvent, alcohols may be used, and non-limiting examples of the alcohols include methanol, ethanol, and isopropyl alcohol. In some embodiments, the pulverization process is performed in such a manner that a first particle diameter difference (D50–D10) of the acquired metal nanoparticles is from about 70 to about 150 nm and a second particle diameter difference (D90–D50) is from about 440 to about 520 nm. Also, it may be performed in such a manner that the average particle diameter of the metal nanoparticles does not exceed about 500 nm.

Furthermore, the concentration of the metal nanoparticle liquid can be adjusted in accordance with conditions and it does not have to be restricted. Preferably, the metal nanoparticles and the organic solvent do not separate from each other and a slurry is formed.

The acquired product and a precursor of amorphous carbon are mixed and undergo a heat treatment to prepare a core-shell-type negative active material. Examples of the precursor of amorphous carbon include, coal pitch, mesophase pitch, petroleum pitch, coal oil, petroleum heavy oil, or polymer resins, e.g., phenol resin, furan resin, and polyimide resin.

In the fabrication process according to an embodiment, mixing ratios of crystalline carbon core, metal nanoparticles and amorphous carbon precursor are as follows. The content of the amorphous carbon of the final product is from about 10 to about 15 wt % based on the total weight of the negative active material, and the content of the crystalline carbon is from about 55 to about 85 wt %. Also, the content of the metal nanoparticles is adjusted to be from about 5 to about 30 wt %. The mixing ratios do not have to be limited specifically.

The heat treatment may be performed at a temperature of from about 800 to about 1200° C. for from about 2 to about 10 hours. The heat treatment carbonizes the amorphous carbon precursor into amorphous carbon, which is inserted to the closed pores and open pores of the core and formed as a shell on the surface of the core.

The negative active material prepared according to an embodiment may be usefully adopted by a rechargeable lithium battery.

According to another embodiment, a rechargeable lithium battery includes a negative electrode including a negative active material, a positive electrode including a positive active material, and a non-aqueous electrolyte.

The negative electrode includes a current collector and a negative active material layer formed on the current collector. The negative active material layer includes the negative active material prepared according to an embodiment, a binder and selectively a conductive material.

The binder improves binding properties of active material particles with one another and with a current collector. Examples of the binder include at least one of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of preferred conductive materials include natural graphite, artificial graphite, conductive polymers, polyphenylene derivatives or combinations thereof.

The current collector may be, for example, a copper foil, a nickel foil, a stainless steel foil, a titanium foil, a nickel foam, a copper foam, a polymer substrate coated with a conductive metal, and combinations thereof.

The positive electrode includes a current collector and a positive active material layer disposed on the current collector. The positive active material includes lithiated intercalation compounds that reversibly intercalate and deintercalate lithium ions. The positive active material may include a composite oxide including at least one of cobalt, manganese, and nickel, as well as lithium. In particular, the following lithium-containing compounds may be used:

$Li_aA_{1-b}X_bD_2$ ($0.90 \leq a \leq 1.8$, and $0 \leq b \leq 0.5$); $Li_aE_{1-b}X_bO_{2-c}D_c$ ($0.90 \leq a \leq 1.8$, $0 \leq b \leq 0.5$, and $0 \leq c \leq 0.05$); $LiE_{2-b}X_bD_4$ ($0 \leq b \leq 0.5$); $LiE_{2-b}X_bO_4D_c$ ($0 \leq b \leq 0.5$, and $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, and $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, and $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, and $0 < \alpha < 2$); $Li_aNi_{1-b-c}Mn_bX_cD_\alpha$ ($0.90 \leq a \leq 1.8$, $0 \leq b \leq 0.5$, $0 c \leq 0.05$, and $0 < \alpha \leq 2$); $Li_aNi_{1-b-c}Mn_bX_cO_{2-\alpha}$ ($0.90 \leq a \leq 1.8$, $0 \leq b \leq 0.5$, $0 \leq c \leq$ and $0.05$, $0 < \alpha < 2$); $Li_aNi_{1-b-c}Mn_bX_cO_{2-\alpha}T_2$ ($0.90 \leq a \leq 1.8$, $0 \leq b < 0.5$, $0 c 0.05$, and $0 < \alpha < 2$); $Li_aNi_bE_cG_dO_2$ ($0.90 \leq a \leq 1.8$, $0 b \leq 0.9$, $0 \leq c \leq 0.5$, and $0.001 \leq d \leq 0.1$); $Li_aNi_bCO_cMn_dG_eO_2$ ($0.90 \leq a \leq 1.8$, $0 \leq b \leq 0.9$, $0 \leq c 0.5$, $0 \leq d \leq 0.5$, and $0.001 \leq e \leq 0.1$); $Li_aNiG_bO_2$ ($0.90 \leq a \leq 1.8$, and $0.001 \leq b \leq 0.1$) $Li_aCoG_bO_2$ ($0.90 \leq a \leq 1.8$, and $0.001 \leq b \leq 0.1$); $Li_aMnG_bO_2$ ($0.90 \leq a \leq 1.8$, and $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ In the above formulas, A is selected from the group consisting of Ni, Co, Mn, and combinations thereof; X is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn and combinations thereof; T is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; Z is selected from the group consisting of Cr, V, Fe, Sc, Y, and combinations thereof; and J is selected from the group consisting of V, Cr, Mn, Co, Ni, Cu, and combinations thereof.

The compound may have a coating layer on the surface, or may be mixed with another compound having a coating layer. The coating layer may include at least one coating element compound selected from the group consisting of an oxide of a coating element, a hydroxide, an oxyhydroxide of a coating element, an oxycarbonate of a coating element, and a hydroxyl carbonate of a coating element. The compound for a coating layer may be amorphous or crystalline. The coating element for a coating layer may include Mg, Al, Co, K, Na, Ca, Si, Ti, V, Sn, Ge, Ga, B, As, Zr or mixtures thereof. The coating layer may be formed in a method having no adverse influence on properties of a positive active material by including these elements in the compound. For example, the method may include any coating method such as spray coating, dipping, and the like, but is not limited thereto.

The positive active material layer also includes a binder and a conductive material.

The binder improves binding properties of the positive active material particles to one another, and also with a current collector. Examples of the binder include at least one of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include one or more of carbon black, acetylene black, ketjen black, carbon fiber, a metal powder or a metal fiber including copper, nickel, aluminum, silver, and polyphenylene derivatives.

The current collector may be, for example, Al but is not limited thereto.

The negative and positive electrodes may be fabricated by a method including mixing the active material, a conductive material, and a binder into an active material composition and coating the composition on a current collector. The electrode manufacturing method is well known, and thus is not described in detail in the present specification. The solvent may be, for example, N-methylpyrrolidone but it is not limited thereto.

In a rechargeable lithium battery according to one embodiment, a non-aqueous electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (wherein R is a $C_2$ to $C_{20}$ linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of from about 1:1 to about 1:9, and when the mixture is used as an electrolyte, the electrolyte performance may be enhanced.

In addition, the electrolyte may further include mixtures of carbonate-based solvents and aromatic hydrocarbon-based solvents. The carbonate-based solvents and the aromatic hydrocarbon-based solvents may be mixed together in the volume ratio of from about 1:1 to about 30:1.

The aromatic hydrocarbon-based organic solvent may be represented by the following Formula 1.

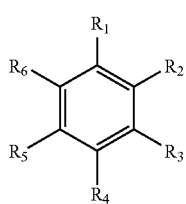

Formula 1 wherein $R_1$ to $R_6$ are independently hydrogen, a halogen, a $C_1$ to $C_{10}$ alkyl, a $C_1$ to $C_{10}$ haloalkyl, or combinations thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous electrolyte may further include vinylene carbonate or an ethylene carbonate-based compound of the following Formula 2.

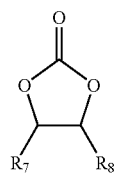

Formula 2 wherein $R_7$ and $R_8$ are independently hydrogen, a halogen, a cyano (CN), a nitro ($NO_2$), and a $C_1$ to $C_5$ fluoroalkyl, an unsaturated aromatic hydrocarbon group, and unsaturated aliphatic hydrocarbon group provided that at least one of $R_7$ and $R_8$ is a halogen, a nitro ($NO_2$), or a $C_1$ to $C_5$ fluoroalkyl and $R_7$ and $R_8$ are not simultaneously hydrogen. The unsaturated aromatic hydrocarbon group includes a phenyl group, and a cyclo 1,3-pentadiene group, whereas the unsaturated aliphatic hydrocarbon group includes an ethylene group, a propylene group, a butadiene group, a pentadiene group, and a hexatriene group.

The ethylene carbonate-based compound may include, for example fluoroethylenecarbonate, difluoroethylenecarbonate, chloroethylenecarbonate, dichloroethylenecarbonate, bromoethylenecarbonate, dibromoethylenecarbonate, nitroethylenecarbonate, cyanoethylenecarbonate, and the like. The use amount of the additive for improving cycle life may be adjusted within an appropriate range.

The lithium salt supplies lithium ions in the battery, operates a basic operation of a rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and $LiB(C_2O_4)_2$ (lithium bisoxalate borate; LiBOB). The lithium salt may be used at from about 0.1 to about 2.0M concentration. When the lithium salt is included at the above concentration range, electrolyte performance and lithium ion mobility may be enhanced due to optimal electrolyte conductivity and viscosity.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
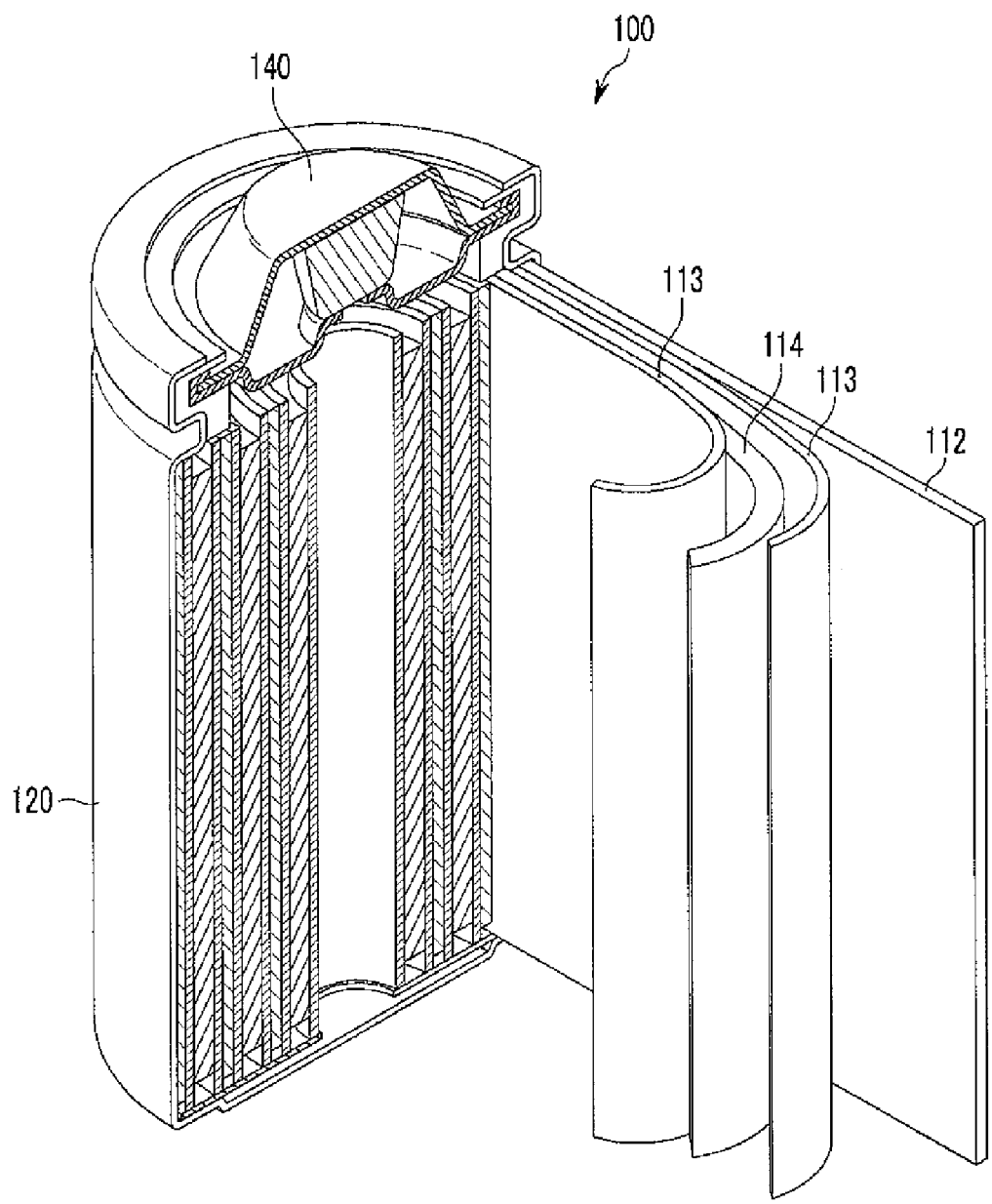
FIG. 2 shows a structure of a rechargeable lithium battery according to one embodiment.

FIG. 2 is a schematic view of a representative structure of a rechargeable lithium battery. FIG. 2 illustrates a cylindrical rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120. The negative electrode 112, positive electrode 114, and separator 113 are sequentially stacked, spirally wound, and placed in a battery case 120 to fabricate such a rechargeable lithium battery 100.

The following examples illustrate the present embodiments in more detail. These examples, however, should not in any sense be interpreted as limiting the scope of the present embodiments.

Example 1

Fabrication of Negative Electrode

An artificial graphite core having an average particle diameter of 20 μm was fabricated by performing rotary milling onto flake-type artificial graphite fine particles having an average particle diameter of 3 μm. During the milling process, the fine particles were agglomerated with each other to thereby form closed pores and open pores inside the fabricated artificial graphite core. The porosity of the inside of the graphite core formed during the agglomeration process was 40%.

Subsequently, beads milling was performed to pulverize silicon and prepare silicon nanoparticles. As a result of the pulverization process, a first particle diameter difference (D50–D10) of the silicon nanoparticles was 120 nm, whereas a second particle diameter difference (D90–D50) was 440 nm. Herein, the average particle diameter of the silicon nanoparticles was 120 nm.

The silicon nanoparticles were added to isopropyl alcohol to thereby prepare a silicon nanoparticle liquid. Herein, the silicon nanoparticles were added to an extent that the isopropyl alcohol and the silicon nanoparticle were not separated from each other and slurry was acquired. The artificial graphite core was immersed in the silicon nanoparticle liquid. Herein, the silicon nanoparticle liquid was inserted to the open pores inside the artificial graphite core.

Subsequently, the acquire product was mixed with petroleum pitch, and a heat treatment was performed thereon at 900° C. for 3 hours to thereby prepare a negative active material. The heat treatment process carbonized the petroleum pitch into hard carbon, which was inserted into closed pores and open pores inside the artificial graphite core, and formed as a shell on the surface of the core to thereby prepare a negative active material. In the above fabrication process, the used amounts of the silicon nanoparticles, the artificial graphite core and the petroleum pitch were as follows. The content of the silicon nanoparticles in the final negative active material was 5 wt %, and the content of the hard carbon was 10 wt %, whereas the content of the artificial graphite was 85 wt %.

The average a particle diameter of the negative active material was about 15 μm. Also, in the negative active material, the content of the silicon nanoparticles was 5 wt %, and the content of the hard carbon was 10 wt %, whereas the content of the artificial graphite was 85 wt %. Also, the porosity of the negative active material was 40 volume % based on the entire volume of the negative active material.

A negative active material slurry was prepared by mixing the negative active material, a polyvinylidene fluoride binder and artificial graphite conductive material at a ratio of 94:3:3 wt % in an N-methylpyrrolidone solvent. A negative electrode was fabricated by coating a Cu-foil current collector with the prepared negative active material slurry through a typical electrode fabrication process.

Fabrication of Positive Electrode

A positive active material slurry was prepared by mixing a $LiCoO_2$ positive active material, a polyvinylidene fluoride binder and a carbon black conductive material in an N-methylpyrrolidone solvent. Herein, the mixing ratio of the positive active material, the binder and the conductive material was 94:3:3 wt %. A positive electrode was fabricated by coating an Al-foil current collector with the positive active material slurry through a typical electrode fabrication process.

A rechargeable lithium cell was fabricated with the positive electrode, the negative electrode and a non-aqueous electrolyte through a typical process. As for the non-aqueous electrolyte, a mixed solvent of ethylene carbonate and fluoroethylene carbonate (3:7 volume ratio) with 1.0M of $LiPF_6$ dissolved therein was used.

Example 2

A negative active material was prepared according to the same method as Example 1, except that the pulverization process was performed in such a manner that a first particle diameter difference (D50–D10) of the silicon nanoparticles was 100 nm and the second particle diameter difference (D90–D50) was 490 nm. The average particle diameter of the prepared negative active material was about 15 μm. Also, in the negative active material, the content of the silicon nanoparticles was 10 wt %, and the content of hard carbon was 10 wt %, while the content of artificial graphite was 80 wt %. Also, the porosity of the negative active material was 45 volume % based on the entire volume of the negative active material.

Using the negative active material and the positive electrode according to Example 1, a rechargeable lithium battery cell was fabricated by the same method as Example 1.

Comparative Example 1

A negative active material was prepared according to the same method as Example 1, except that the pulverization process was performed in such a manner that a first particle diameter difference (D50–D10) of the silicon nanoparticles was 230 nm and the second particle diameter difference (D90–D50) was 680 nm. The average particle diameter of the prepared negative active material was about 15 μm. Also, in the negative active material, the content of the silicon nanoparticles was 20 wt %, and the content of hard carbon was 15 wt %, while the content of artificial graphite was 65 wt %. Also, the porosity of the negative active material was 35 volume % based on the entire volume of the negative active material.

Using the negative active material and the positive electrode according to Example 1, a rechargeable lithium battery cell was fabricated by the same method as Example 1.

The capacity retentions (cycle-life characteristics) of the rechargeable lithium cells prepared according to Examples 1 and 2, and Comparative Example 1 were measured and the results were presented in the following Table 1. The capacity retention (cycle-life characteristics) was measured by charging and discharging at 1.0 C under 25° C. for 100 times, and the measurement results were shown as a ratio of a discharge capacity at 100th cycle to discharge capacity at 1st cycle.

TABLE 1

| | First particle diameter difference (D50−D10) | Second particle diameter difference (D90−D50) | Capacity retention (%) |
|---|---|---|---|
| Comparative Example 1 | 230 nm | 680 nm | 76.5 |
| Example 1 | 120 nm | 440 nm | 87.0 |
| Example 2 | 100 nm | 490 nm | 82.1 |

It can be seen from Table 1 that Examples 1 and 2 using a positive active material mixture had improved cycle-life characteristics compared to Comparative Example 1 using only cobalt-based positive active material.

While these embodiments have been described in connection with what is presently considered to be practical exemplary embodiments, it is to be understood that the embodiments are not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
   a crystalline carbon core including pores;
   an amorphous carbon shell positioned on a surface of the core;
   metal nanoparticles dispersed inside the pores; and
   amorphous carbon inside the pores,
   wherein a first particle diameter difference (D50−D10) of the nanoparticles is from about 70 to about 150 nm and the second particle diameter difference (D90−D50) of the nanoparticles is from about 440 to about 520 nm.

2. The negative active material of claim 1, wherein the first particle diameter difference (D50−D10) of the nanoparticles is from about 90 to about 130 nm and the second particle diameter difference (D90−D50) of the nanoparticles is from about 440 to about 500 nm.

3. The negative active material of claim 1, wherein the metal nanoparticles have an average particle diameter of from about 100 to about 500 nm.

4. The negative active material of claim 1, wherein the metal nanoparticles comprise at least one selected from the group consisting of Si, a Si—Y alloy, Sn, a Sn-Q alloy, Al, Ga, In, Pb, As, Sb, Ag, and combinations thereof;
   wherein Y and Q are each independently an element selected from the group consisting of an alkali metal, an alkaline-earth metal, a group 13 element, a group 14 element, a transition element, a rare earth element, and combinations thereof,
   wherein Y is not Si; and
   wherein Q is not Sn.

5. The negative active material of claim 4, wherein the element Y is selected from the group consisting of Mg, Ca, Sr, Ba, Ra, Sc, Y, La, Ti, Zr, Hf, V, Nb, Ta, Cr, Mo, W, Tc, Re, Fe, Ru, Os, Hs, Rh, Ir, Ni, Pd, Pt, Cu, Ag, Au, Zn, Cd, B, Ge, P, As, Sb, Bi, S, Se, Te, Po, and combinations thereof.

6. The negative active material of claim 4, wherein the metal is selected from the group consisting of Si, Sn, Al, Ge, and combinations thereof.

7. The negative active material of claim 1, wherein the pores include closed pores not connected to the shell and open pores connected to the shell.

8. The negative active material of claim 1, wherein the pores include closed pores not connected to the shell and open pores connected to the shell, and the metal nanoparticles are dispersed in the open pores.

9. The negative active material of claim 1, wherein the pores include closed pores not connected to the shell and open pores connected to the shell, and
   the amorphous carbon is dispersed in the closed pores and the open pores.

10. The negative active material of claim 1, wherein the content of the metal nanoparticles is from about 5 to about 30 wt % based on a total weight of the negative active material.

11. The negative active material of claim 1, wherein a content of the amorphous carbon is from about 10 to about 15 wt % based on a total weight of the negative active material.

12. The negative active material of claim 1, wherein the negative active material has a porosity from about 30 to about 50 volume % based on an entire volume of the negative active material.

13. The negative active material of claim 1, wherein the crystalline carbon is selected from the group consisting of natural graphite, artificial graphite and a mixture thereof.

14. The negative active material of claim 1, wherein the amorphous carbon is selected from the group consisting of soft carbon, a low temperature fired carbon, hard carbon, mesophase pitch carbide, fired coke and a mixture thereof.

15. A rechargeable lithium battery, comprising:
   an electrode comprising a negative active material comprising a crystalline carbon core including pores; an amorphous carbon shell positioned on a surface of the core; metal nanoparticles dispersed inside the pores; and amorphous carbon inside the pores, wherein a first particle diameter difference (D50−D10) of the nanoparticles is from about 70 to about 150 nm and the second particle diameter difference (D90−D50) of the nanoparticles is from about 440 to about 520 nm;
   a positive electrode including a positive active material; and
   a non-aqueous electrolyte.

16. The rechargeable lithium battery of claim 15, wherein the first particle diameter difference (D50−D10) of the nanoparticles is from about 90 to about 130 nm and the second particle diameter difference (D90−D50) of the nanoparticles is from about 440 to about 500 nm.

17. The rechargeable lithium battery of claim 15, wherein the metal nanoparticles have an average particle diameter from about 100 to about 500 nm.

18. The rechargeable lithium battery of claim 15, wherein the metal nanoparticles comprise at least one selected from the group consisting of Si, a Si—Y alloy, Sn, a Sn-Q alloy, Al, Ga, In, Pb, As, Sb, Ag, and combinations thereof;
   wherein Y and Q are each independently an element selected from the group consisting of an alkali metal, an alkaline-earth metal, a group 13 element, a group 14 element, a transition element, a rare earth element, and combinations thereof,
   wherein Y is not Si; and
   wherein Q is not Sn.

19. The rechargeable lithium battery of claim 18, wherein the metal is selected from the group consisting of Si, Sn, Al, Ge, and combinations thereof.

20. The rechargeable lithium battery of claim 15, wherein the pores include closed pores not connected to the shell and open pores connected to the shell.

21. The rechargeable lithium battery of claim 15, wherein the pores include closed pores not connected to the shell and open pores connected to the shell, and
   the metal nanoparticles are dispersed in the open pores.

22. The rechargeable lithium battery of claim 15, wherein the pores include closed pores not connected to the shell and open pores connected to the shell, and the amorphous carbon is dispersed in the closed pores and the open pores.

23. The rechargeable lithium battery of claim 15, wherein a content of the metal nanoparticles is from about 5 to about 30 wt % based on a total weight of the negative active material.

24. The rechargeable lithium battery of claim 15, wherein a content of the amorphous carbon is from about 10 to about 15 wt % based on a total weight of the negative active material.

25. The rechargeable lithium battery of claim 15, wherein the negative active material has a porosity from about 30 to about 50 volume % based on an entire volume of the negative active material.

26. The rechargeable lithium battery of claim 15, wherein the crystalline carbon is selected from the group consisting of natural graphite, artificial graphite and a mixture thereof.

27. The rechargeable lithium battery of claim 15, wherein the amorphous carbon is selected from the group consisting of soft carbon, a low temperature fired carbon, hard carbon, mesophase pitch carbide, fired coke and a mixture thereof.

* * * * *

UNITED STATES PATENT AND TRADEMARK OFFICE
CERTIFICATE OF CORRECTION

PATENT NO.      : 8,309,254 B2
APPLICATION NO. : 12/775320
DATED           : November 13, 2012
INVENTOR(S)     : Hwang et al.

It is certified that error appears in the above-identified patent and that said Letters Patent is hereby corrected as shown below:

In the Specification

In column 1 at line 33, before "(0<x<1)," insert --$LiNi_{1-x}Co_xO_2$--.

In column 4 at line 22, change "229 a" to --229a--.

In column 5 at line 11, change "for from" to --for--.

In column 5 at line 58, change "$LiE_{2-b}X_bO_4D_c$" to --$LiE_{2-b}X_bO_{4-c}D_c$--.

In column 5 at line 64, before "(0.90" insert --$T_\alpha$--.

In column 5 at line 66, change "0 c 0.05," to --$0 \leq c \leq 0.05$,--.

In column 5 at line 67, change "0 b≤0.09," to --$0 \leq b \leq 0.09$,--.

In column 6 at line 2, change "0≤c 0.5," to --$0 \leq c \leq 0.5$,--.

In column 6 at line 8, after "$LiFePO_4$" insert --.--.

Signed and Sealed this
Twenty-third Day of July, 2013

Teresa Stanek Rea
*Acting Director of the United States Patent and Trademark Office*